United States Patent [19]

Baker et al.

[11] 4,334,254

[45] Jun. 8, 1982

[54] GATED SNUBBER CIRCUIT

[75] Inventors: Richard H. Baker, Bedford, Mass.; Arthur A. Baumgarten, Jr., Morris Plains, N.J.

[73] Assignee: Exxon Research and Engineering Company, Florham Park, N.J.

[21] Appl. No.: 115,208

[22] Filed: Jan. 25, 1980

[51] Int. Cl.$^3$ ............................................. H02H 7/122
[52] U.S. Cl. ........................................ 361/9; 363/133; 363/138
[58] Field of Search .................. 361/159, 56, 8, 9, 13; 363/133, 137, 138, 54, 57, 58; 307/246, 254, 294

[56] References Cited

U.S. PATENT DOCUMENTS

| | | | |
|---|---|---|---|
| 3,257,604 | 6/1966 | Colclaser | 363/133 X |
| 3,418,495 | 12/1968 | Bose | 307/246 X |
| 3,571,614 | 3/1971 | Rolstead | 361/13 |
| 3,641,407 | 2/1972 | Scott | 361/6 |
| 4,015,185 | 3/1977 | Pollmeier | 363/133 |

OTHER PUBLICATIONS

Kuecken, "Solid State Motor Controls", Tab Books, Jun. 1978, pp. 43-45.

Primary Examiner—Reinhard J. Eisenzopf
Attorney, Agent, or Firm—Kenneth Watov

[57] ABSTRACT

A voltage snubber connected to the output terminals of a transistorized, push-pull inverter for supplying bidirectional current to an inductive load comprises a snubber capacitor and relatively large valued resistor connected in series with each other across the output terminals of the inverter and a switching circuit for bypassing the resistor during turn-off periods of the inverter transistors. The value of the snubber resistor is high enough to provide slow recharging of the snubber capacitor during turn-on periods of the inverter transistors to reduce transistor power dissipation. When the resistor is bypassed by the switching circuit during the inverter transistor turn-off periods, the snubber is gated on to suppress high voltage surges generated by the inductive load. The snubber switching circuit is responsive to current sensors or logic commands connected in circuit with the inverter to detect turn-off transistors of the inverter transistors. In one embodiment, the switching circuit comprises an NPN transistor and a PNP transistor both connected in shunt with the snubber resistor and turned on in response, respectively, to turn-off currents in the positive and negative legs of the push-pull inverter. In a second embodiment, the secondary winding of a transformer is connected in shunt with the snubber resistor. The primary winding is short-circuited by a pair of NPN transistors in response to turn-off current in either inverter leg to electrically bypass the snubber resistor.

37 Claims, 7 Drawing Figures

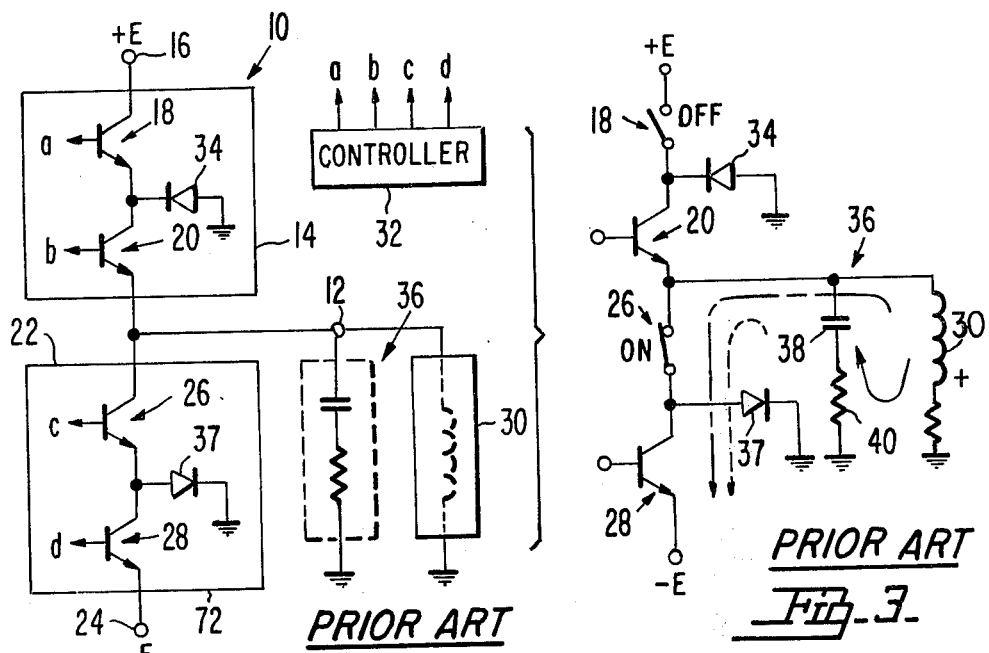
*PRIOR ART*
Fig. 1.
*PRIOR ART*
Fig. 3.
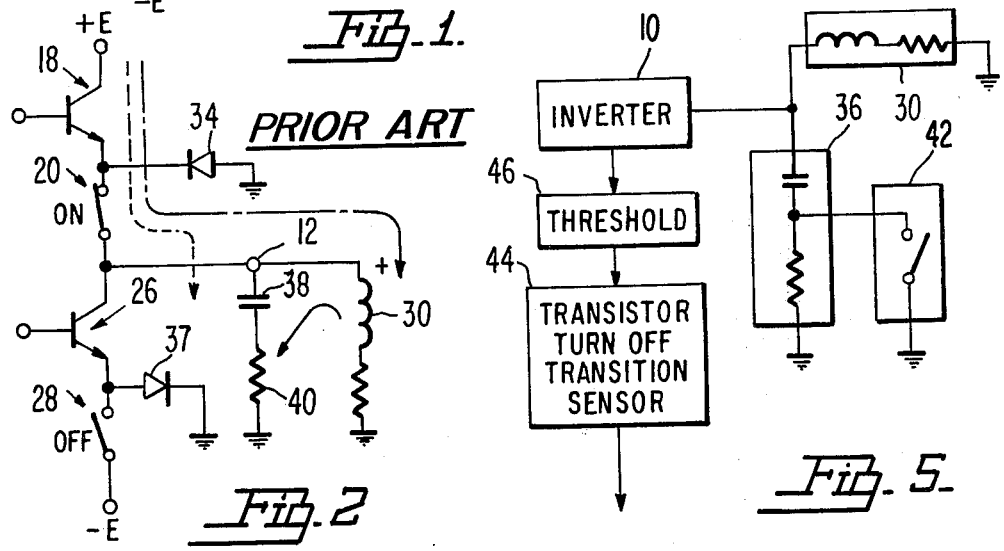
*PRIOR ART*
Fig. 2.
Fig. 5.
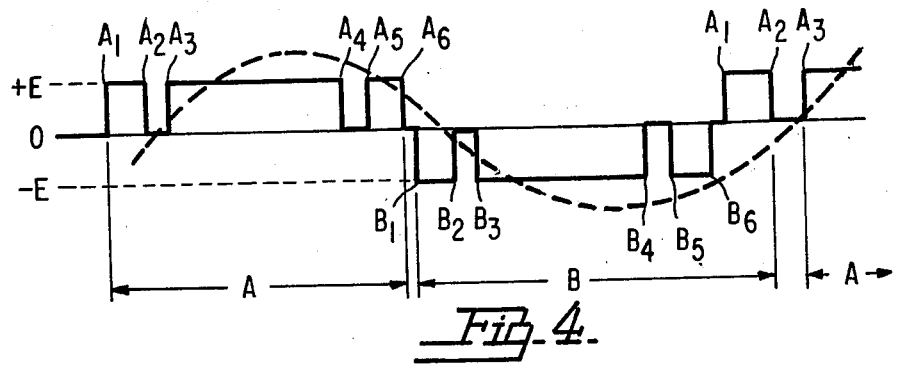
Fig. 4.

GATED SNUBBER CIRCUIT

TECHNICAL FIELD

The present invention relates generally to voltage snubber circuitry, and more particularly toward a novel class of snubber capacitor circuit having particular application to transistorized, push-pull type inverter circuits for suppressing turn-off voltage surges impressed across the inverter transistors during turn-off periods without increasing transistor power dissipation by capacitor recharge current loading.

BACKGROUND ART

When a transistor having an inductive load is turned off, that is, switched from a conducting state to a nonconducting state, the sudden reduction of current flowing through the inductive load causes its magnetic flux field to collapse. The collapsing flux produces a back electromotive force (EMF) of voltage across the inductor at such a polarity as to generate a current to oppose the changing flux. In high magnitude loads of the type commonly encountered in motor control, for example, and switching times on the order of one microsecond or less, the back EMF applied across the transistor may be on the order of magnitude of 100's of kilovolts at high peak instantaneous current levels. Because the presence of the inductive load tends to cause the locus of the operating point of the transistor during switching to define a path in the ($I_c$, $V_{ce}$) plane that is significantly displaced from the origin, the transistor is subjected to relatively high instantaneous power dissipation.

Several different methods have been provided for reducing surge currents and voltages in power transistors during inductive load switching. A common technique for snubbing the current surge imparted by the inductive load during transistor turn-on has been to connect an inductor in series with the collector of the transistor to reduce the time rate of change of current and a flyback diode across the snubber inductor to enable "freewheeling" of current generated by the snubber. Voltage surges impressed across the collector and emitter terminals of the transistor during turn-off switching are commonly limited by a Zener diode connected across the collector and emitter of the transistor or are suppressed by a snubber capacitor connected between the collector and emitter. Transient current and voltage control techniques of the limiter and snubber types are shown, for example, in U.S. Pat. Nos. 3,641,407 and 3,418,495 as well as in Kuecken, *Solid State Motor Controls*, Tab Books, June, 1978, pages 39–45.

Whereas current snubbing using a series inductor has been found to be satisfactory, voltage limiting using Zener diodes or other threshold device or suppressing using snubber capacitors have certain disadvantages. Zener diodes can reliably dissipate only a limited amount of power and are prone to failure. In order to maximize reliability in view of the large voltage surges created by the inductive kick during turn-off switching of heavy inductive loads, such as motors, very large, costly Zener diodes must be used in conservative design. Although snubber capacitors, which are more reliable and less costly than large Zener diodes, effectively suppress voltage transients by supplying a current path between the inductive load and ground during the turn-off switching transitions of the transistors, capacitor recharge currents flowing through the transistors during the turn-on transitions increase transistor power dissipation. In a voltage snubber circuit for a transistor operated inverter, for example, of a type wherein transistors are switched sequentially in positive and negative legs of the inverter to supply bidirectional current having a predetermined waveform to an inductive load, turn-off transient voltages impressed across the transistors are suppressed by current flow established between the load and ground through the snubber capacitor. During the transistor turn-on transitions, however, the snubber capacitor recharge current flowing through the inverter transistors in addition to load current significantly increases the instantaneous power dissipation in the transistors. The magnitude of the capacitor recharge current is substantial since the snubber capacitor must be large to maintain low the dV/dT transient voltages impressed across the switching transistors in a high current, short switching time environment.

One object of the invention, therefore, is to provide an improved snubber circuit for suppressing the surge voltage applied across a transistor under inductive loading during turn-off.

Another object is to provide a voltage snubber circuit wherein there is no flow of significant capacitor recharge current through snubber protected transistors during turn-on.

An additional object is to provide a gated snubber circuit connected to the output of a push-pull type inverter wherein the snubber is gated on in response to transistor turn-off transitions in the positive and negative legs of the inverter.

DISCLOSURE OF INVENTION

A gated voltage snubber, in accordance with the invention, comprises a snubber circuit connected to the output of a transistorized push-pull type inverter and a switching circuit for gating the snubber on only during turn-off periods of the inverter transistors. The snubber circuit comprises a snubber capacitor and resistor connected in series with each other between the output of the inverter and ground. The value of the capacitor depends upon the size of the inductive load and turn-off time of the inverter transistors whereas the value of the resistor is large enough to permit slow recharging of the snubber capacitor during the transistor turn-on periods. The switching circuit bypasses the snubber to ground during the turn-off periods of the inverter transistors to provide a flow path to ground for current generated by the back EMF of the inductive load.

In accordance with one embodiment, turn-off periods of the inverter transistors are sensed by a resistor connected between each leg of the inverter and ground through a steering diode that conducts back-EMF generated current during negative transitions in the output current waveform. NPN and PNP transistors are connected to bypass the snubber resistor to ground in response to voltages impressed across the sensing resistors caused by the back-EMF induced current flowing from the load into one of the legs of the push-pull inverter during inverter transistor turn-off. In a second embodiment, the secondary winding of a transformer is connected in shunt with the snubber resistor. The ends of the primary winding of the transformer are connected to ground respectively through first and second NPN switching transistors. The transistors are normally biased off by a sequencer to cause the secondary winding to have a high effective impedance to snubber current.

During the turn-off periods of the inverter transistors, the NPN transistors are simultaneously turned on by the sequencer to electrically short circuit the primary winding to ground. The shorted primary reflected to the secondary circuit of the transformer shunts the snubber resistance to ground to enable turn-off voltage suppression by the snubber.

BRIEF DESCRIPTION OF DRAWINGS

FIG. 1 is a simplified circuit diagram of a push-pull type inverter and a conventional RC voltage snubber;

FIGS. 2 and 3 illustrate charge and discharge current paths through the conventional snubber during operation of the inverter of FIG. 1;

FIG. 4 is a diagram of the current and voltage waveforms generated by the inverter of FIG. 1;

FIG. 5 is a simplified circuit diagram showing a gated snubber circuit in accordance with the principles of the present invention;

BEST MODE FOR CARRYING OUT THE INVENTION

Figure 6:
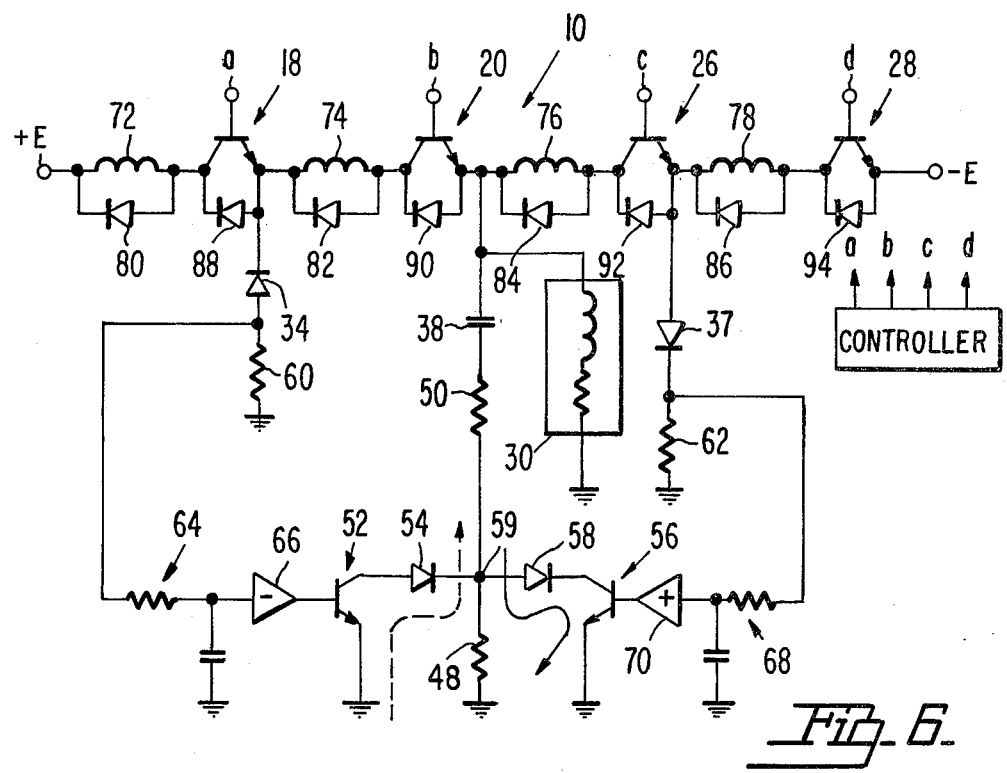
FIG. 6 is a circuit diagram of one embodiment of a gated snubber circuit of the type shown in FIG. 5.

Referring to FIGS. 1–4, the operation of a standard push-pull type inverter circuit having a conventional RC voltage snubber wil be described to better appreciate operative deficiencies of the conventional snubber solved by the present invention. Inverter and snubbing operation will be described with reference to a single phase inverter or a single phase of a multiple-phase inverter. It is to be understood, however, that the principles of the invention are applicable to multiphase inverter systems as well as to other single and multiple phase switching systems under inductive load. In FIG. 1, a push-pull type inverter, designated generally by the numeral 10, is connected between positive and negative voltage sources $+E$, $-E$ at terminals 16, 24, respectively, and has an output terminal 12. A positive leg 14 of the inverter 10, connected between the positive supply terminal 16 and output terminal 12, contains a first pair of series connected, NPN power transistors 18, 20; the negative inverter leg 22 connected between the output terminal 12 and negative supply terminal 24 contains a second pair of series connected, NPN transistors 26 and 28. The inverter legs 14 and 22 typically also contain series inductors to provide current snubbing during turn-on of the transistors as well as protective diodes to limit reverse voltage applied across the collector and emitter junctions of the transistors and freewheeling diodes to dissipate snubber inductor induced flyback currents. These conventional current snubber inductors and protective diodes are not shown in FIGS. 1–3 for simplicity, but are described in more detail in the discussion of the preferred embodiments shown in FIGS. 6 and 7, infra.

An inductive load 30 connected between output terminal 12 of the inverter 10 and ground receives bidirectional current generated by the inverter legs 14 and 22 as transistors 18, 20, 26 and 28 are selectively sequenced on and off by a conventional sequence controller 32 which may be, for example, a programmed microprocessor, to develop a predetermined load current waveform.

Exemplary voltage and current waveforms generated across a load by an inverter of a type shown in FIG. 1 are illustrated graphically in FIG. 4. It is to be understood, of course, that the waveforms are only exemplary and can be modified in accordance with particular on and off sequencing of transistors 18, 20, 26 and 28 in legs 14 and 22 of the inverter 10. The output voltage waveform applied to load 30 is shown in solid line in FIG. 4 whereas the corresponding current waveform through the load is shown in dotted line. The voltage waveform, characterized by $+E$, zero and $-E$ voltage levels having variable durations controlled by the sequencer 32, is generated by switching the transistors 18, 20, 26 and 28 on and off in the following manner. The voltage level $+E$ is obtained at load terminal 12 when transistors 18 and 20 are on and transistors 26 and 28 are off. The $-E$ voltage level is developed at the output terminal 12 when transistors 26 and 28 are on and transistors 18 and 20 are off. The zero level voltage at output 12 is developed when transistors 20 and 26 are on and transistors 18 and 28 are off. In practice, on transistors are turned off before off transistors are turned on to avoid excessive current flow between the two voltage sources.

During the entire period A (FIG. 4), when a positive voltage waveform is applied to output terminal 12, transistor 28 is maintained off to disable the negative leg of the inverter (see FIG. 2). Transistor 20 is maintained on during that period so that current flow through load 30 is controlled by turn-on and turn-off of transistors 18 and 26; the output terminal 12 receives $+E$ volts when transistors 18 and 26 are on and off, respectively, and receives ground potential through diode 37 when the transistors are in the opposite states. During period B when a negative voltage waveform is applied across load 30, transistor 18 is maintained open to disable the positive leg 14 of the inverter and transistor 26 is maintained closed; the negative voltage waveform is thus controlled by the turn-on and turn-off sequencing of transistors 20 and 28 (see FIG. 3). The output terminal 12 receives $-E$ volts when transistors 20 and 28 are off and on respectively, and receives ground potential through diode 34 when the transistors are in the opposite states.

During the entire period A, the load voltage undergoes positive transitions at times $A_1$, $A_3$ and $A_5$ whereas negative transitions occur at times $A_2$, $A_4$ and $A_6$. During time period B, positive transitions occur at times $B_2$, $B_4$ and $B_6$, whereas negative transitions occur at times $B_1$, $B_3$ and $B_5$. Due to the lagging phase characteristic of inductive load 30, however, the voltage and current waveforms are in phase with each other between times $A_3$ and $A_6$ and between times $B_3$ and $B_6$ and are out of phase with each other between times $A_1$ and $A_2$ and between times $B_1$ and $B_2$. A small amount of dwell time is designed into the voltage waveform between time periods $A_2$ and $A_3$ and between time periods $B_2$ and $B_3$ to enable switching transients to settle. Current flows through diode 34 between times $A_2$ and $A_3$ (only when current is positive), $A_4$ and $A_5$, $A_6$ and $B_1$, $B_2$ and $B_3$ (only when current positive). Current flows through diode 37 between times $B_2$ and $B_3$ (only when current is negative), $B_4$ and $B_5$, $B_6$ and $A_1$. It is apparent from inspection of the waveforms of FIG. 4 that current flows through diodes 34 and 37 only during the turn-off periods of transistors in the two inverter legs 14 and 22, and that the current is generated by the back EMF of inductive load 30.

The operation of the inverter 10 including conventional snubber 36 will now be described with reference to FIGS. 2 and 3. Considering first generation of the positive waveform during duration A (FIG. 4), with transistor 26 maintained on and transistor 28 maintained off, and assuming that transistors 18 and 26 are initially off and on, respectively, the voltage waveform generated during positive duration A is developed by sequencing transistors 18 and 26 as follows. At time $A_1$, transistor 18 is turned on and transistor 26 is turned off to cause the +E volts to be applied from positive source terminal 16 to output terminal 12. At time $A_2$, transistor 18 is turned off and transistor 26 is turned on to establish a current path between ground and output terminal 12 through the transistor 20 and diode 34 in positive inverter leg 14. Each time transistor 18 switches from on to off, a voltage is induced across the inductor 30 having the polarity indicated in FIG. 2 to oppose the negative current change. The self-induced voltage across the load 30 generates a current shown in solid arrow flowing to ground through snubber 36 comprising capacitor 38 and low value series resistor 40 connected between inverter output terminal 12 and the ground. The effect of the snubber 36 is to suppress the voltage applied across the collector and emitter terminals of transistor 18 during turn-off by providing a shunt path to ground of the back EMF induced current generated by inductive load 30.

During turn-on of transistor 18, load current flows through the transistor and inductive load 30 as shown by the dot-dash arrow. An additional component, however, shown in the dotted arrow, flows through transistor 18 to recharge capacitor 38. This additional recharge current can be substantial depending upon the sizes of capacitor 38 and resistor 40. In practice, motor loads require a relatively large capacitor and small resistor to provide enough discharge current during snubbing to suppress the relatively large dV/dT voltages generated by inductive load 30 during turn-off. The additional recharge current component that flows through transistor 18 during turn-on causes undesirable additional power dissipation in and heating of the transistor. A larger transistor having a substantial peak current rating is therefore required due to the provision of the snubber 36.

Similar comments can be made with respect to the operation of snubber 36 during on and off switching of transistors 20 and 28 with transistor 18 maintained off and transistor 26 maintained on during time interval B. Thus, during the turn-off transitions of transistor 28, the back EMF having the polarity indicated in FIG. 3 generated by inductive load 30 causes a current to flow through snubber 36 in the direction of the solid arrow to prevent a surge voltage from being applied across the transistor 28. During turn-on of transistor 28, however, a capacitor recharge current shown in dotted arrow flows through the transistor in addition to negative load current shown in dot-dash arrow. This additional current component again causes undesirable additional heating in the switching transistor 28.

In accordance with the invention, voltage snubbing is enabled during the turn-off periods of the load switching transistors 18 and 28 in inverter 10 by sensing the turn-off periods and controlling a switching means to gate on the snubber; the switching means maintains the snubber disabled during the turn-on transitions to prevent capacitor recharge current from flowing through the inverter transistors at a substantial rate. Stated another way, the time constant of the snubber is maintained at a high value during the turn-on periods of the inverter transistors 18, 28 to slowly recharge the snubber capacitor and is gated to a low value during the turn-off periods to provide the snubber action.

Referring to FIG. 5, the broad concept of the present invention is shown schematically, wherein a normally open switching means 42 connected between snubber 36 and ground is closed in response to an output generated by a transistor turn-off period sensor 44. Preferably, sensor 44 is responsive to back EMF generated current flowing through the transistors in each of the inverter legs 14 and 22 and may further be responsive to a threshold detector 46 that prevents closing of switch means 42 during light current loading of the inverter 10. The switching means 42 preferably closes very early in the transistor turn-off period to prevent any substantial back EMF voltage surge from being impressed across the transistor. The switching means 42 also preferably opens at the end of the transistor turn-off period without any over-shoot into the turn-on period to prevent flow of high level, short duration capacitor recharge current through the inverter transistor at the beginning of its turn-on period.

Figure 7:
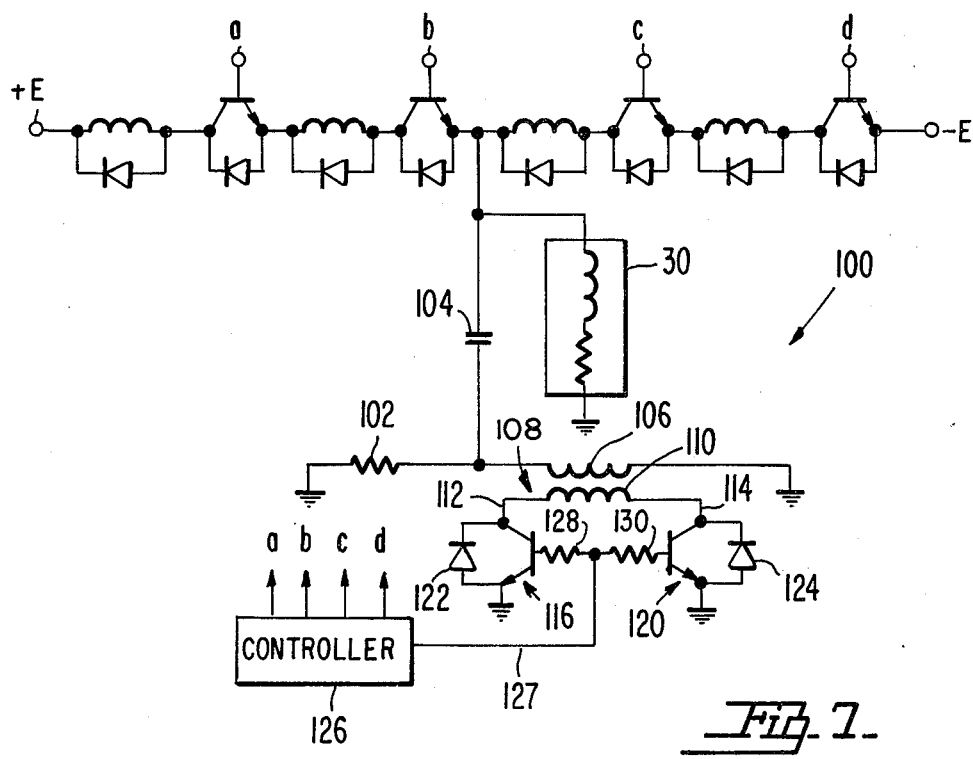
FIG. 7 is a circuit diagram of a second embodiment of the gated snubber circuit.

Referring now to FIGS. 6 and 7, two circuits for practicing the system shown schematically in FIG. 5 are illustrated. The circuit in FIG. 6 uses a pair of complementary transistors 52, 56 controlled respectively by turn-off current sensor resistors 60 and 62 to gate on snubber 36. The circuit in FIG. 7 uses a pair of like transistors 116, 120 controlled by a sequencer 126 to gate snubber 36 on through transformer 108.

In FIG. 6, the snubber resistance corresponding to resistor 40 in FIGS. 2 and 3 comprises a first resistor 48 and a second resistor 50 connected in series with each other and with capacitor 38. A PNP transistor 52 is connected across resistor 48 to ground through a diode 54. Similarly, an NPN transistor 56 is connected across the resistor 48 to ground through diode 58. The resistor 48 is of relatively high value (much higher than resistor 40 in FIGS. 2 and 3) to substantially disable snubber 36 when transistors 52, 56 are both off. Current for recharging snubber capacitor 38 during the turn-on periods of the inverter transistors 18, 28 thus passes through resistors 50 and 48 at a rate low enough to prevent any significant additional heating of the inverter transistors during turn-on. Resistor 48 also provides a current return path to ground of snubber current when the two transistors 52 and 54 are off and provides stable reference voltage at node 59. Resistor 50, on the other hand, has a low value for optimization of the time constant of the snubber 36 for particular inductive load magnitudes and switching times.

During the turn-on transitions of the transistors in inverter legs 14 and 22, the transistors 52 and 56 are maintained off to disable snubbing action by snubber 36 while capacitor 38 is charged slowly through the inverter 10 and resistors 50 and 48. When transistor 56 is turned on, current flows through the diode 58 and transistor toward ground to bypass resistor 48, as shown by the arrow. Similarly, when transistor 52 is turned on, current flowing toward inverter 10 from ground bypasses the resistor 48 through the diode 50 and the transistor in the direction of the dotted arrow. In accordance with the invention, the two transistors 52 and 56 are alternately sequenced on and off to cause positive and negative currents to bypass the resistor 48 through the two transistors to thereby gate on the snubber 36 by connecting capacitor 38 to ground through the low value resistor 50.

The sequencing of transistors 52 and 56 is provided in response to currents flowing in inverter legs 14 and 22. These currents are sensed by resistors 60 and 62 connected in series with diodes 34 and 37. As explained supra with respect to FIGS. 1-4, current flows through diode 34 during the turn-off periods of load current switching transistor 20; similarly, current flows through diode 37 during the turn-off periods of negative load current switching transistor 26.

The voltage applied across sensor resistor 60 by inverter 10 is supplied to the base of transistor 52 through an integrator 64 and an inverting amplifier 66. Similarly, the voltage applied across sensor resistor 62 by the inverter 10 is supplied to the base of transistor 56 through integrator 68 and non-inverting amplifier 70. Resistors 60 and 62 control transistors 52 and 56 to bypass snubber resistor 48 only during the turn-off periods of inverter transistors 20 and 26. The output of sensor 60 in response to negative current flowing from ground into inverter 10 during turn-off of transistor 18 is a negative voltage that is inverted in amplifier 66 and applied to the base of transistor 52. Similarly, the output of sensor 62 in response to a positive current flowing from the inverter 10 to ground during turn-off of transistor 28 is a positive voltage applied through amplifier 70 to the base of transistor 56. The magnitudes of resistors 60 and 62 as well as the gain of amplifiers 66 and 70 provide the threshold function of element 46 in FIG. 5 by enabling snubbing only in response to load currents of at least a predetermined magnitude during the transistor turn-off periods.

Inductors 72, 74, 76 and 78 are conventional current snubbing inductors for reducing current surges during the turn-on transitions of the inverter transistors 18, 20, 26 and 28. Diodes 80, 82, 84 and 86 are flyback diodes for absorbing surge voltages generated by the current snubber inductances 72–78. Diodes 88, 90, 92 and 94 are conventional voltage limiting diodes connected across collector and emitter terminals of the inverter transistors 18, 20, 26 and 28 to prevent damage to the transistors as a result of excessive reverse voltages. The remaining diodes 54 and 58 in FIG. 6 protect transistors 52 and 56 from reverse voltages generated through snubber 36. Integrators 64 and 68 prevent turn-on of transistors 52 and 56 in response to any spurious high frequency voltages impressed across the sensors 60 and 62 by currents in the inverter 10.

Referring to FIG. 7, the second preferred embodiment 100 for gating snubber 36 comprises a resistor 102 connected in series with snubber capacitor 104 and shunted to ground by the secondary winding 106 of a transformer 108. The value of resistor 102 is large enough to prevent snubber action by capacitor 104 but permits slow recharging of the capacitor through inverter 10 during the inverter transistor turn-on periods. The secondary winding 110 of transformer 108 has its output terminals 112 and 114 connected to ground through NPN transistors 116 and 120. Diodes 122 and 124 are connected respectively across the collector-emitter terminals of transistors 116 and 120 to provide a reverse current flow path and protect against excessive collector-to-emitter voltages impressed across the transistors by transformer primary coil 106.

The transistors 116 and 120 are biased normally off by controller 126 and base resistors 128, 130 to maintain the secondary coil 106 of transformer 108 normally open circuited. The impedance of primary coil 106 with secondary coil 110 open circuited is substantially greater than the resistance of resistor 102, i.e., greater by at least one order of magnitude. The resistance of resistor 102 in series with capacitor 104 therefore establishes a time constant of the snubber 36 which is high enough to enable only slow charging of the capacitor 104 during turn-on of the inverter transistors to minimize transistor power dissipation, as explained above.

Sequencer 126 controls the switching sequence of inverter transistors 18, 20, 26 and 28 to generate a predetermined waveform, such as the one in FIG. 4, in a known manner. During turn-off of either of the load switching transistors 18, 28 in inverter 10, transistors 116 and 120 are simultaneously turned on by a control signal generated on line 127 of sequencer 126 to enable bidirectional current flow in the primary winding 110; one current flow path includes diode 122 and transistor 120 whereas the opposite current flow path includes diode 124 and transistor 116. The reflected impedance of the effectively short-circuited primary winding 110 into the circuit of the secondary winding 106 causes the impedance of the secondary winding to be nearly zero to shunt resistor 102 to ground. During turn-off of inverter transistors 18 or 28, therefore, the snubber 36 is gated on to suppress turn-off voltage transients by providing a current flow path from inductive load 30 to ground through capacitor 104 and winding 106. Since transistors 116 and 120 are controlled by sequence controller 126 to turn off prior to the turn-on times of the inverter transistors, the inverter transistors never conduct any significant capacitor recharge current during turn-on since the capacitor 104 charges slowly through resistor 102. As a result, the peak current requirement of the inverter transistors is reduced which enables application of somewhat smaller, less costly transistors.

Gated snubbing as disclosed herein, reduces the current handling requirements of the inverter transistors, and protects the transistors from second breakdown. In addition, the snubber gating transistors (transistors 52 and 56 in FIG. 6 as well as transistors 116 and 120 in FIG. 7) are inexpensive switching transistors because switching is never required in the presence of high impressed voltages or heavy inductive currents.

We claim:

1. In an inverter system of a type comprising transistor means selectively switched on and off to deliver bidirectional current flow between a D.C. power source and an inductive load, wherein a transient high voltage tends to be generated by the inductive load across the inverter system during each turnoff transition of said transistor means:
   an active snubber circuit for suppressing said load generated transient voltage, comprising snubber means connected in shunt with said inductive load;
   means for monitoring current flow through said transistor means; and
   gating means controlled by said monitoring means for gating on said snubber means only during turn off periods of said transistor means.

2. The snubber circuit of claim 1, wherein said gating means includes:
   means for maintaining said snubber means normally gated off;
   means for sensing a turn-off period of said transistor means; and
   means responsive to said sensing means for gating on said snubber means to provide transient voltage snubbing.

3. The snubber circuit of claim 2, wherein said snubber means includes a capacitor means and said gating means includes switch means in series with said capacitor means.

4. The snubber circuit of claim 3, wherein said snubber means further includes a high impedance means in series with said capacitor means, and said switch means is connected to selectively bypass said high impedance means in response to said sensing means.

5. The snubber circuit of claim 4, wherein said high impedance means includes a resistor having a value high enough to prevent fast recharging of said capacitor means during turn-on of said inverter transistor means.

6. The snubber circuit of claim 5, wherein said sensing means includes means for sensing transistor current during the turn-off periods of said inverter transistor means, and said snubber gating means includes means responsive to a voltage developed across said sensing means for generating a gate control signal.

7. The snubber circuit of claim 6, wherein said sensing means includes resistor means connected in circuit with said inverter transistor means.

8. The snubber circuit of claim 7, wherein said sensing means further includes steering diode means in series with said resistor means for providing unidirectional current flow through said resistor means.

9. The snubber circuit of claim 8, wherein said switch means includes transistor means in shunt with said high impedance means, and said gating means includes means for biasing said transistor means normally off; and means coupled to said sensing means for turning said transistor means on during the turn-off periods of said inverter transistor means.

10. The snubber circuit of claim 9, wherein said inverter system includes a positive leg and a negative leg, said positive leg having a positive supply terminal and an output terminal, said negative leg having a negative supply terminal and an output terminal, the output terminals of said positive and negative legs being connected to each other at a common output terminal, said common output terminal being connectable to drive said inductive load; said sensing resistor means including a first resistor connected to be responsive to current in the positive leg of said inverter and a second resistor connected to be responsive to current in the negative leg of said inverter, said steering diode means including a first diode in series with said first resistor and poled to conduct current into said positive leg and a second diode in series with said second resistor and poled to conduct current out of said negative leg, said transistor means including first and second complementary transistors each connected in shunt with said high value resistor and responsive respectively to voltages developed across said first and second current sensing resistors to turn on said first and second transistors and thereby bypass said high value resistor.

11. The snubber circuit of claim 10, including threshold detector means responsive to the voltages developed across said sensing resistors for disabling said first and second transistors in response to inverter load current less than a predetermined magnitude.

12. The snubber circuit of claim 2, wherein said snubber means includes a snubber capacitor in series with a resistor having a resistance value high enough to prevent fast recharging of said snubber capacitor during turn-on of said inverter transistor means, and said gating means includes switch means for selectively bypassing said high value resistor during the turn-off periods of said inverter transistor means.

13. The snubber circuit of claim 12, wherein said switch means includes a transformer having a secondary winding connected across said high value resistor, and first means responsive to said sensing means for selectively open circuiting and short circuiting a primary winding of said transformer to change an effective impedance of said secondary winding.

14. The snubber circuit of claim 13, wherein said first means includes first and second transistors connected respectively between output terminals of the primary winding, said first and second transistors being biased normally off to open circuit said primary winding, said transistors being turned on simultaneously in response to said sensing means to short circuit said primary winding.

15. The snubber circuit of claim 13, wherein said first and second transistors are like poled and connected respectively between output terminals of said primary winding and ground, and a diode connected across the emitter and collector terminals of each of said first and second transistors and poled to conduct current in a direction opposite current flow through its corresponding transistor.

16. An inverter system for supplying bidirectional current flow to an inductive load connected between an output terminal of said system and a ground, comprising:
a positive inverter leg connectable between a positive voltage source and the output terminal and a negative inverter leg connectable between a negative voltage source and the output terminal, said positive and negative inverter legs including transistor means having on and off operative states;
means for selectively controlling said transistor means between the on and off states to apply a predetermined current waveform across said load;
snubber means connected between the output terminal of said inverter and the ground, comprising capacitance means for suppressing voltage transients generated by said inductive load during turn-off transitions of said inverter transistor means;
means for monitoring current flow through said transistor means, and
gating means controlled by said monitoring means for gating said snubber means on only during turn off periods of said inverter transistor means.

17. The system of claim 16, wherein said gating means includes means for maintaining said snubber means normally gated off;
said monitoring means includes means for sensing a turn-off of said transistor means in the positive or negative legs of said inverter; and
means responsive to said sensing means for gating on said snubber means.

18. The system of claim 17, wherein said snubber means includes a snubber capacitor and said gating off means includes a resistor connected in series with said capacitor between the inverter output terminal and ground, said resistor having a value high enough to prevent fast recharging of said capacitor during turn-on of said inverter transistor means, and said gating on means includes switch means responsive to said sensing means for selectively bypassing said high value resistor.

19. The system of claim 18, wherein said switch means includes switching transistor means connected in shunt with said high value resistor, means for biasing said switching transistor means normally off and means responsive to said sensing means for turning said switching transistor means on.

20. The system of claim 19, wherein said sensing means includes first and second current sensors responsive to transistor turn-off periods respectively in the positive and negative inverter legs, and said switching transistor means includes first and second switching transistors each connected in shunt with said high value resistor and responsive, respectively, to said first and second current sensors.

21. The system of claim 19, wherein said switching transistor means includes an NPN transistor and a PNP transistor, each of said transistors having output terminals connected in shunt with said high value resistor, said NPN transistor being turned on in response to inductive load generated current flowing in the positive leg of said inverter, said PNP transistor being turned on in response to inductive load generated current flowing in the negative leg of said inverter.

22. The system of claim 16, wherein said gating means includes means for maintaining said snubber means normally gated off, means for generating a signal during the turn-off periods of said inverter transistor means, and means for gating on said snubber means during turn-off periods of said inverter transistor means.

23. The system of claim 22, wherein said snubber means includes a snubber capacitor and said gating off means includes a resistor connected in series with said snubber capacitor between the inverter output terminal and ground, said resistor having a resistance value high enough to prevent fast recharging of said snubber capacitor during turn-on of said inverter transistor means, and said gating on means includes first switch means for selectively bypassing said high value resistor.

24. The system of claim 22, wherein said first switch means includes transformer means having a secondary winding connected in shunt with said high value resistor and having a primary winding, and second switch means connected across said primary winding, means for maintaining said second switch means normally open to cause said secondary winding to have a large impedance to snubber current, and means for closing said second switch means and thereby short circuiting said primary winding, said secondary winding in response to the short circuited primary winding providing a low impedance path across said high value resistor.

25. The system of claim 24, wherein said second switch means includes first and second transistors having outputs connected respectively between the output terminals of said primary winding and ground and having inputs connected to be responsive to said turn-off signal.

26. In a snubber circuit adapted to be connected in circuit with an inverter of a type providing bidirectional current flow between first and second voltage sources and an inductive load, said inverter including a positive leg to be connected between the first voltage source and the load and a negative leg to be connected between the second voltage source and the load, said positive and negative inverter legs including transistor means selectively sequenced on and off to apply a predetermined bidirectional current waveform to the load, the snubber circuit including a snubber capacitor to be connected in shunt with the load to conduct to ground current generated by back EMF developed by the inductive load during turn-off periods of said inverter transistor means, an improvement comprising means for measuring current flow through said transistor means, gating means controlled by said current flow measuring means for selectively gating said snubber circuit on and off, said gating means including switch means for maintaining said snubber circuit normally gated off, and means for controlling said switch means to gate on said snubber circuit to provide transient voltage snubbing only during turn-off periods of said inverter transistor means.

27. The improvement of claim 26, including means for sensing the turn-off periods of said inverter transistor means, said gating means controlling means being responsive to said sensing means.

28. The improvement of claim 27, including a resistor in series with said snubber capacitor, said resistor having a resistance value high enough to prevent fast recharge of said snubbing capacitor during turn-on periods of said inverter transistor means.

29. The improvement of claim 28, wherein said switch means is connected to selectively bypass said high value resistor.

30. The improvement of claim 29, wherein said switch means includes transistor means, means for biasing said transistor means normally off, and means responsive to said sensing means for turning said transistor means on.

31. The improvement of claim 30, wherein said transistor means includes a first switching transistor and a second switching transistor, and said sensing means includes first means for sensing back EMF generated current flow in said positive inverter leg and second means for sensing back EMF generated current flow in said negative inverter leg, and means for controlling said first and second switching transistors in response, respectively, to said first and second current flow sensing means.

32. The improvement of claim 31, wherein said first and second transistors are respectively NPN and PNP transistors, and said first and second current flow sensing means include diode steering means for causing said first and second current flow sensing means to be responsive to opposite polarity, unidirectional currents.

33. The improvement of claim 26, including a resistor in series with said snubber capacitor, said resistor having a resistance value high enough to prevent fast recharge of said snubber capacitor during turn-on periods of said inverter transistor means, and wherein said switch means includes a transformer having a secondary winding connected across said high value resistor and having a primary winding; and means for selectively open circuiting and short circuiting said primary winding.

34. The improvement of claim 33, wherein said last named means includes transistor means connected in circuit with said primary winding; means for biasing said transistor means normally off; and means for turning on said transistor means during the turn-off periods of said inverter transistor means.

35. In an inverter system for supplying bidirectional current flow between positive and negative voltage sources and an inductive load, said inverter system comprising a positive leg to be connected between the positive voltage source and the load and a negative leg to be connected between the negative voltage source and the load, wherein said inverter legs contain transistor means selectively switched on and off in a particular sequence to supply a predetermined current waveform to the load, a voltage snubbing method using a snubber circuit connected in shunt with the inductive load for suppressing inductive load generated voltage transients, comprising the steps of:

generating first and second signals during respective turn-on and turn-off periods of said transistor means;

gating off said snubber circuit during generation of said first signal; and gating on said snubber circuit during generation of said second signal to provide transient voltage snubbing.

36. The method of claim 35, wherein said generating step includes the steps of sensing transistor current during turn-off of said transistor means; generating said first voltage in the absence of inductive load generated current through said transistor means; and generating said second signal in the presence of said inductive load generated current through said transistor means.

37. The method of claim 36, wherein said last named step includes detecting a magnitude of said transistor current, and generating said second signal when said detected current magnitude is greater than a predetermined current magnitude.

* * * * *